United States Patent
Kato et al.

(10) Patent No.: US 9,843,088 B2
(45) Date of Patent: Dec. 12, 2017

(54) ANTENNA DEVICE AND METHOD OF SETTING RESONANT FREQUENCY OF ANTENNA DEVICE

(71) Applicant: Murata Manufacturing Co., Ltd., Nagaokakyo-shi, Kyoto-fu (JP)

(72) Inventors: Noboru Kato, Nagaokakyo (JP); Katsumi Taniguchi, Nagaokakyo (JP); Jun Sasaki, Nagaokakyo (JP); Naoki Gochi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/404,489

(22) Filed: Jan. 12, 2017

(65) Prior Publication Data

US 2017/0133741 A1    May 11, 2017

Related U.S. Application Data

(63) Continuation of application No. 13/604,801, filed on Sep. 6, 2012, now Pat. No. 9,564,678, which is a continuation of application No. 13/272,365, filed on Oct. 13, 2011, now abandoned, which is a
(Continued)

(30) Foreign Application Priority Data

Apr. 21, 2009   (JP) .................................. 2009-103358

(51) Int. Cl.
*H01Q 1/22*    (2006.01)
*H01Q 7/00*    (2006.01)

(52) U.S. Cl.
CPC ............. *H01Q 1/2216* (2013.01); *H01Q 7/00* (2013.01)

(58) Field of Classification Search
CPC ..................................................... H01Q 1/2216
See application file for complete search history.

(56) References Cited

U.S. PATENT DOCUMENTS 7,068,227 B2 *  6/2006  Ying ...................... H01Q 1/242
343/702

FOREIGN PATENT DOCUMENTS

JP          11025244 A  *  1/1999

OTHER PUBLICATIONS

Antenna Theory: A Review, Balanis, Proc. IEEE vol. 80 No. 1 Jan. 1992.*

(Continued)

*Primary Examiner* — Robert Karacsony
*Assistant Examiner* — Amal Patel
(74) *Attorney, Agent, or Firm* — Keating & Bennett, LLP

(57) ABSTRACT

In antenna device, a coil conductor of an antenna coil module and a conductor layer at least partially overlap. A current flows in the conductor layer to block a magnetic field generated by a current flowing in the coil conductor. A current flows along the periphery of a slit and around the periphery of the conductor layer due to a cut-edge effect. Since magnetic flux does not pass through the conductor layer, magnetic flux attempts to bypass the conductor layer along a path in which the conductor opening of the conductor layer is on the inside and the outer edge of the conductor layer is on the outside. As a result, the magnetic flux generates large loops that link the inside and the outside of a coil conductor of an antenna on a reader/writer side to couple an antenna device and the antenna on the reader/writer side.

10 Claims, 6 Drawing Sheets

Related U.S. Application Data continuation of application No. PCT/JP2009/066336, filed on Sep. 18, 2009.

(56) References Cited

OTHER PUBLICATIONS

Kato et al., "Antenna Device and Method of Setting Resonant Frequency of Antenna Device", U.S. Appl. No. 15/404,485, filed Jan. 12, 2017.
Kato et al., "Antenna Device and Method of Setting Resonant Frequency of Antenna Device", U.S. Appl. No. 13/604,801, filed Sep. 6, 2012.

* cited by examiner

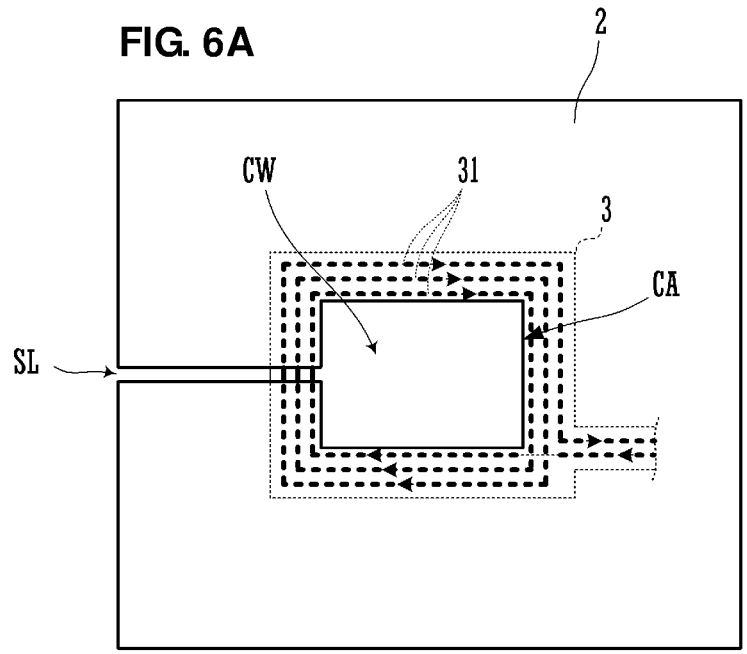
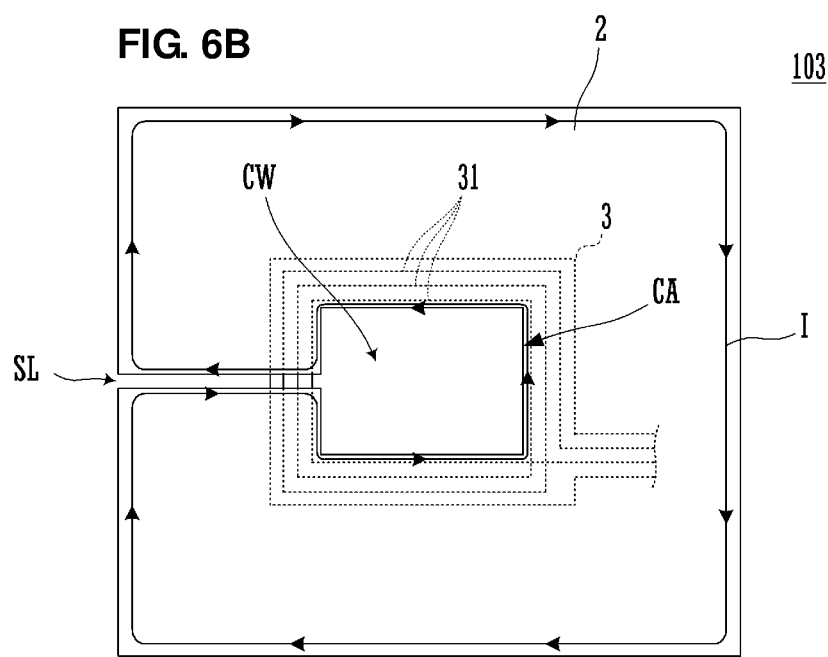

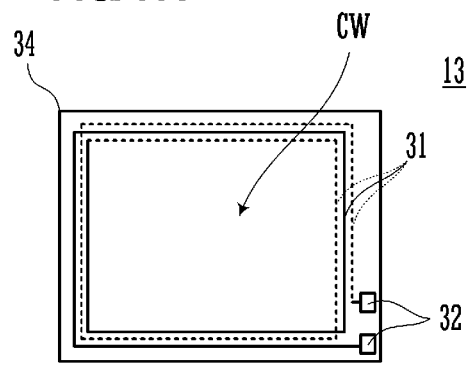
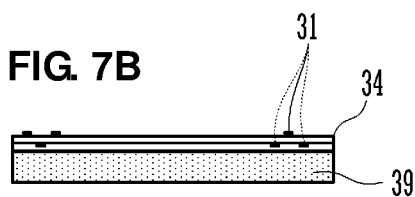
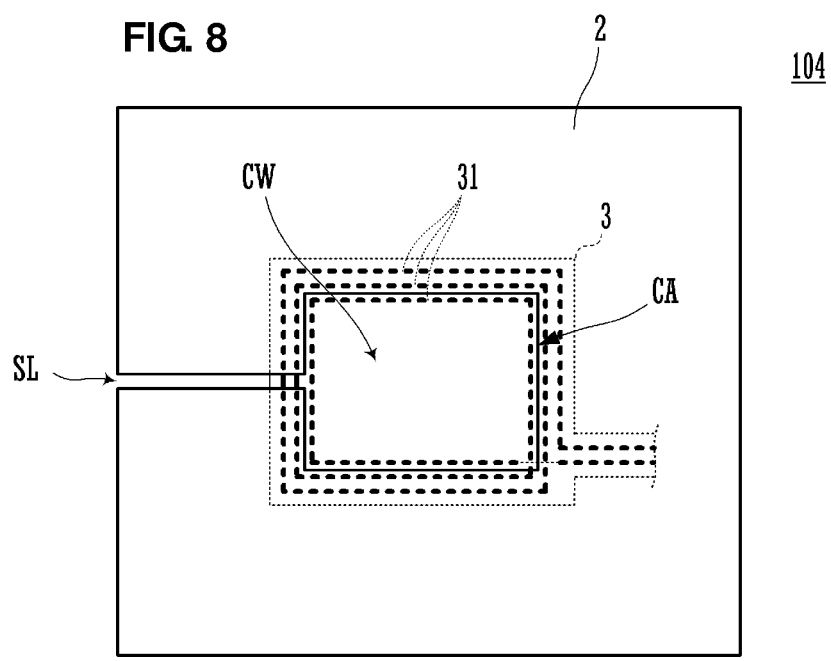

ANTENNA DEVICE AND METHOD OF SETTING RESONANT FREQUENCY OF ANTENNA DEVICE

BACKGROUND OF THE INVENTION

1. Field of the Invention

The present invention relates to antenna devices preferably for use in RFID systems and short-range wireless communication systems, such systems performing communication through electromagnetic signals with appliances that are communication partners, and also relates to methods of setting the resonant frequency of such antenna devices.

2. Description of the Related Art

In RFID systems and short-range wireless communication systems, which have become widely used in recent years, in order to facilitate communication between mobile electronic appliances such as mobile telephones or between a mobile electronic appliance and a reader/writer, a communication antenna is mounted in each of the appliances. Among such antennas, an antenna to be mounted in a mobile electronic appliance is disclosed in Japanese Unexamined Patent Application Publication No. 2006-270681.

FIG. 1 is a view illustrating communication between a mobile information terminal 21 and a reader/writer as disclosed in Japanese Unexamined Patent Application Publication No. 2006-270681 when the mobile information terminal 21 and the reader/writer are in the vicinity of each other. In the example illustrated in FIG. 1, a magnetic field H, which is part of the electromagnetic waves radiated from a transmitting/receiving antenna unit 26 of the reader/writer, is affected by metal objects such as a battery pack 25 within a main body 22 of the terminal and is weakened due to reflection, absorption and the like. A metal layer 30 is arranged closer to a side onto which the electromagnetic waves are incident than a location of a communication surface CS of an antenna module 10. An induced current (eddy current) is generated due to the external magnetic field acting on the front surface of the metal layer 30 and a magnetic field H1 generated as a result of this current causes generation of an induced electric current in an antenna coil 15 of the antenna module 10.

In this example, the metal layer 30 is arranged close to and facing the antenna module 10 so as to cover part of the antenna coil 15 and thereby inductive coupling occurs between the transmitting/receiving antenna unit 26 of the reader/writer and the antenna coil 15 of the antenna module 10 via the magnetic field component H1 that arises around the metal layer 30.

The antenna device illustrated in FIG. 1 attempts to solve a problem in that when the antenna of the antenna device and the antenna on the communication partner side are brought close to each other and the distance therebetween becomes very small, the communication characteristics fluctuate greatly depending on the magnitude of positional displacement between the centers of the two antenna. In order to reduce the degree to which magnetic flux, which is attempting to link the antenna coil 15 of the antenna module 10 on the mobile information terminal 21 side and transmitting/receiving antenna unit 26 on the reader/writer side, is blocked by metal objects such as the battery pack 25 within the casing, the metal layer 30 is provided to induce magnetic flux in that region. Therefore, a substantial effect cannot be regularly or reliably obtained by changing the positions of shielding members such as the battery pack 25.

Furthermore, the metal layer 30 effectively does not regularly or reliably increase the communication range in a state in which the antenna device and the antenna on the communication partner side are spaced apart from each other.

SUMMARY OF THE INVENTION

Accordingly, preferred embodiments of the present invention provide an antenna device that, even when the size of the antenna device is small compared to that of an antenna on the communication-partner side, is capable of stable communication and is also capable of increasing the maximum possible communication range, and also provide a method of adjusting the central resonant frequency of the antenna device.

An antenna device according to a preferred embodiment of the present invention is provided in an electronic appliance and includes a coil conductor having a loop shape or a spiral shape in which a winding center portion provides a coil opening; and a conductor layer that is arranged on a side closer to an antenna on a communication partner side than a location of the coil conductor; wherein the conductor layer includes a conductor opening and a slit, the slit connecting the conductor opening and an outer edge of the conductor layer; and when the substrate is viewed in plan view, the coil conductor and conductor layer are superposed one on top of the other.

A method of setting a resonant frequency of an antenna device according to another preferred embodiment of the present invention includes the steps of mounting inside a casing of an electronic appliance an antenna coil module that is formed by stacking a substrate on which a loop-shaped or spiral-shaped coil conductor, in which a winding center portion defines a coil opening, has been formed, on a magnetic sheet, arranging a conductor layer in the casing on a side that is closer to an antenna of a communication partner side than a location of the coil conductor; and forming a conductor opening and a slit in the conductor layer, the slit connecting the conductor opening and an outer edge of the conductor layer; wherein, when the substrate is viewed in plan view, the coil opening and the conductor opening at least partially overlap, and the resonant frequency is set to be lower than a central frequency of a to-be-used frequency band when the conductor layer is not present and is set to be the central frequency of the to-be-used frequency band when the antenna coil module has been mounted inside the casing of the electronic appliance.

According to various preferred embodiments of the present invention, a current flows through the conductor layer so that a magnetic field, which is generated by the current flowing through the coil conductor, is blocked. Then, a current flows around the periphery of the opening in the conductor layer and a current flows along the periphery of the slit and around the periphery of the conductor layer due to the cut-edge effect. As a result, a magnetic field arises around the conductor layer and the communication range can be increased.

In addition, since the conductor layer causes large loops of magnetic flux to circulate, the magnetic flux extends from the antenna device to the antenna on the communication partner side or from the antenna on the communication partner side to the antenna device, and the maximum possible range of communication between the antenna device and the antenna on the communication partner side becomes large.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A and 5B are views of an antenna device according to a second preferred embodiment of the present invention, wherein FIG. 5A is a plan view of the interior of a lower casing 1 of an electronic appliance, and FIG. 5B is a plan view of a state in which the antenna coil module 3 has been mounted on an inner surface of the lower casing 1.

FIGS. 6A and 6B are plan views of an antenna device 103 according to a third preferred embodiment of the present invention wherein FIG. 6A illustrates the current that flows through a coil conductor 31 and FIG. 6B illustrates a current 1 that flows through a conductor layer 2.

FIG. 7A is a plan view of an antenna coil module 13 according to a fourth preferred embodiment of the present invention and FIG. 7B is a front view thereof.

FIG. 8 is a plan view of an antenna device 104 according to a fifth preferred embodiment of the present invention.

DETAILED DESCRIPTION OF THE PREFERRED EMBODIMENTS

First Preferred Embodiment

An antenna device and a method of setting a resonant frequency of the antenna device according to a first preferred embodiment of the present invention will be described with reference to FIGS. 2A to 4B.

Figure 1:
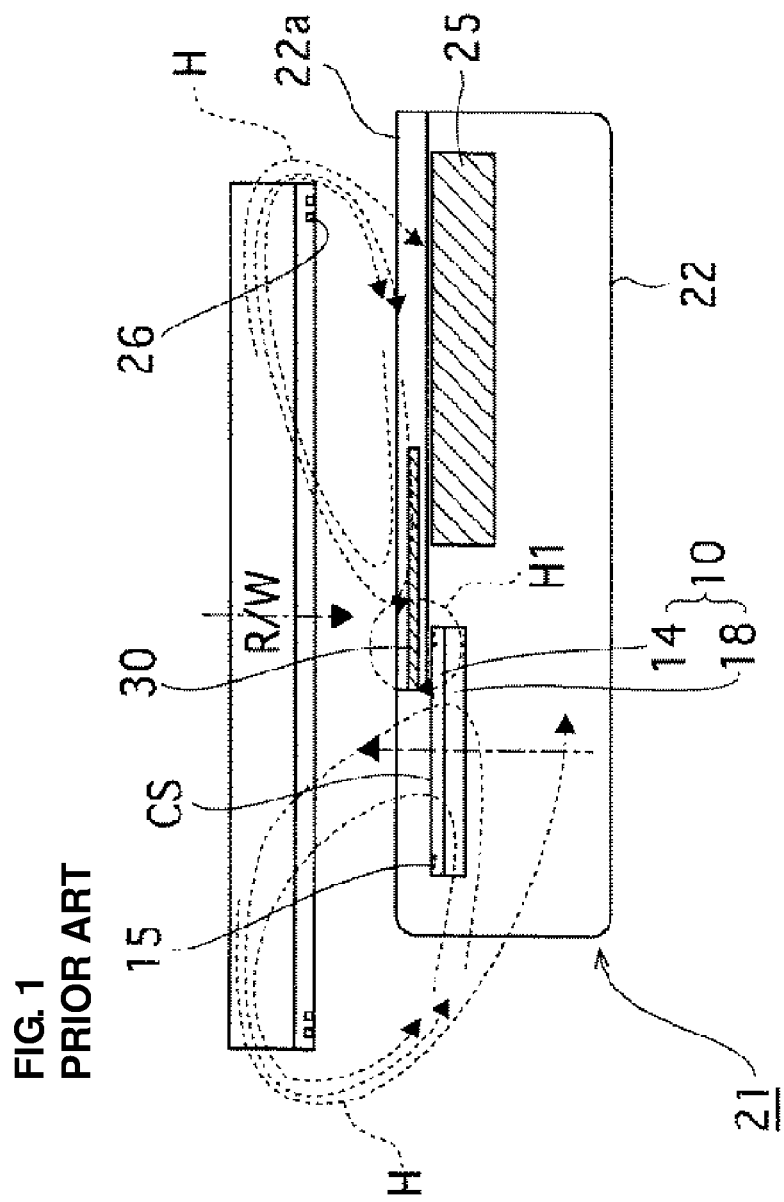
FIG. 1 is a view illustrating a situation in which communication is performed between the mobile information terminal 21 and the reader/writer as disclosed in Japanese Unexamined Patent Application Publication No. 2006-270681 when the mobile information terminal 21 and the reader/writer are in the vicinity of each other.
Figure 2A:
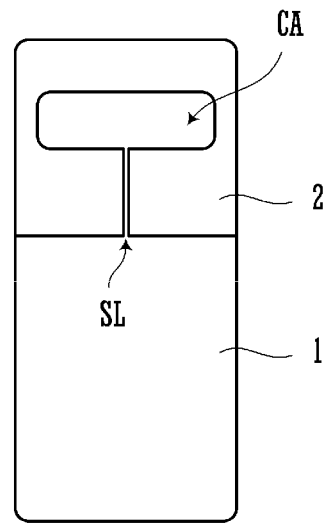
FIG. 2A is a view of a rear surface of an electronic appliance that is equipped with an antenna device according to a first preferred embodiment of the present invention.
Figure 2B:
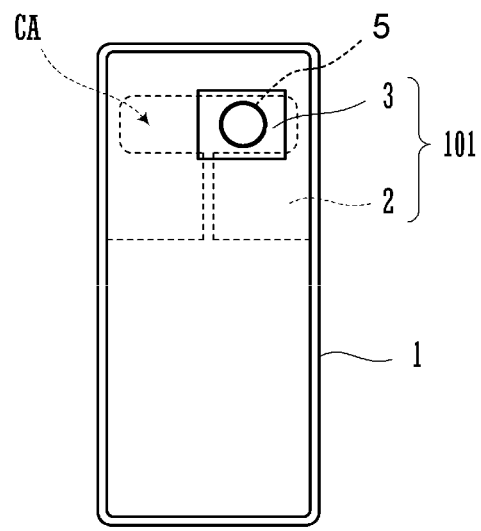
FIG. 2B is a plan view of the interior of a lower casing viewed from the rear surface side.

FIG. 2A is a view of a rear surface of an electronic appliance that is equipped with the antenna device according to the first preferred embodiment of the present invention. The rear surface of the electronic appliance faces an antenna on a reader/writer side, which is a communication partner side. FIG. 2B is a plan view of the interior of a lower casing on the rear surface side. Only the structures of principal components are illustrated in FIGS. 2A and 2B.

As illustrated in FIG. 2A, a conductor layer 2 is located on an outer surface of a lower casing 1. The conductor layer 2 is, for example, a vapor-deposited metal film such as an aluminum film. A conductor opening CA and a slit SL, which connects the conductor opening CA and an outer edge of the conductor layer 2, are provided in the conductor layer 2.

As illustrated in FIG. 2B, an antenna coil module 3 is arranged on an inner surface of the lower casing 1 so as to partially cover the conductor opening CA.

In this preferred embodiment, a camera module is to be installed in the conductor opening CA, for example. It is preferable for a lens 5 of the camera module to be exposed to the outside through an opening in the casing. Therefore, by arranging the conductor opening so as to coincide with the opening provided in the casing in this way, there is no need to design a special casing taking into account provision of the conductor layer 2.

In addition, in cases such as where a portion of an outer surface of the casing is preferably metallic from a design point of view, a metal film is preferably formed on the outer surface of the casing by vapor deposition or other suitable process and the metal film may double as the conductor layer.

By forming the conductor layer 2 on an inner or outer surface of the casing of the electronic appliance in this way, there is no need to ensure there is a dedicated space in which to arrange the conductor layer 2 and a conductor layer 2 having a large area can be arranged.

Figure 3A:
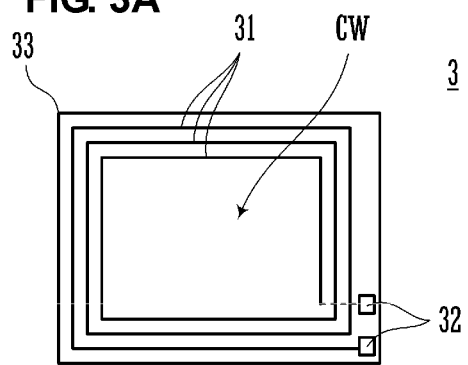
FIG. 3A is a plan view of the antenna coil module 3 and FIG. 3B is a front view thereof.
Figure 3B:
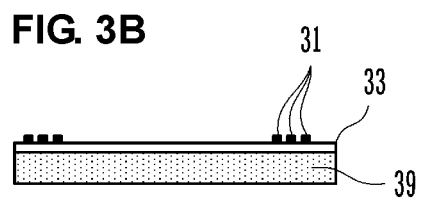

FIGS. 3A and 3B are a plan view and a front view of the antenna coil module 3, respectively. The antenna coil module 3 preferably includes a rectangular-sheet-shaped flexible substrate 33 and a magnetic sheet 39 having the same or substantially the same rectangular sheet-shaped configuration as the flexible substrate 33. Connectors 32 are provided on the flexible substrate 33 and are used to connect a spiral-shaped coil conductor 31, in which a winding center portion provides a coil opening CW, and an external circuit. The magnetic sheet 39 preferably is, for example, made of a ferrite formed in a sheet-shaped configuration.

The number of windings (number of turns) of the coil conductor 31 is determined on the basis of the required inductance. If there is only one turn, a simple loop-shaped coil conductor is formed.

The antenna coil module 3 is arranged so that the antenna coil module 3 is mounted on an inner surface of the lower casing 1 of the electronic appliance as illustrated in FIG. 2B, and when an upper casing is stacked thereon, the connectors 32 contact predetermined pins of a circuit board mounted in the upper casing.

The circuit board is provided with a capacitor that is connected in parallel with the connectors 32. The resonant frequency is determined by the inductance defined by the coil conductor 31 and the magnetic sheet 39 of the antenna coil module 3 and the capacitance of the capacitor. For example, in the case where a HF band is used having a central frequency of 13.56 MHz, the resonant frequency is determined to be 13.56 MHz.

Figure 4A:
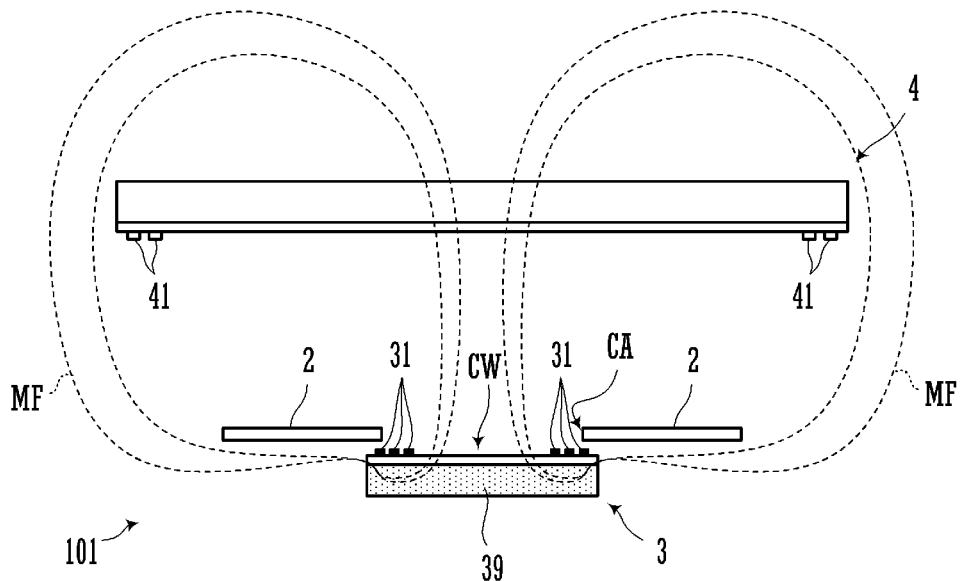
FIG. 4A is a sectional view illustrating a state in which the antenna device 101 and the antenna on the reader/writer side are magnetically coupled.
Figure 4B:
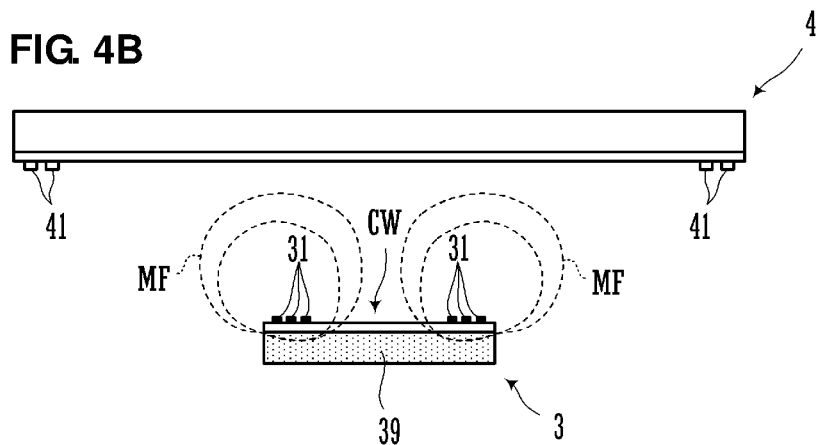
FIG. 4B is a sectional view illustrating a state in which there is no conductor layer 2, as a comparative example.

FIG. 4A is a sectional view illustrating a state in which the antenna device 101 and the antenna on the reader/writer side are magnetically coupled. Furthermore, FIG. 4B is a sectional view illustrating a state in which there is no conductor layer 2, as a comparative example. Components of the casing of the electronic appliance are omitted from the figures.

Since at least a portion of the coil conductor 31 of the antenna coil module 3 is covered by the conductor layer 2, a current flows through the conductor layer such that the magnetic field that arises due to the current flowing through the coil conductor is blocked. Then, a current, which flows around the periphery of the opening of the conductor layer, passes along the periphery of the slit and flows around the periphery of the conductor layer due to a cut-edge effect. In addition, a current also flows through the planar portion of the conductor layer. Accordingly, a magnetic field arises around the conductor layer and since magnetic flux does not penetrate through the conductor layer 2, magnetic flux MF attempts to bypass the conductor layer 2 along a path in which the conductor opening CA of the conductor layer 2 is on the inside and the outer edge of the conductor layer 2 is on the outside. As a result, the magnetic flux MF draws relatively large loops that link the inside and the outside of a coil conductor 41 of an antenna 4 on the reader/writer side. In other words, the antenna device 101 and the antenna 4 on the reader/writer side are magnetically coupled.

Furthermore, the magnetic flux, which is attempting to link the coil conductor 31 and the antenna on the communication partner side, can circulate through the coil opening CW and the conductor opening CA due to the fact that the coil opening CW and the conductor opening CA at least partially overlap when the coil conductor 31 is viewed in plan view. Specifically, when the coil opening CW and the conductor opening CA overlap over almost the entire peripheries thereof when the coil conductor 31 is viewed in plan view, the coil conductor 31 can be made to effectively radiate a magnetic field.

In addition, large magnetic field loops can be generated due to the fact that the area of the conductor layer 2 is larger than the area of the region over which the coil conductor 31 is formed.

Furthermore, the directivity of the antenna can be made to be wider in the antenna direction of the communication partner by stacking the magnetic sheet 39 on the surface of the flexible substrate 33 that is on the side farther from the antenna on the communication partner side.

In this way, since it turns out that the magnetic flux is oriented in directions that extend beyond the conductor layer 2, stable communication can be realized even when the antenna device 101 and the reader/writer are close to each other in a state where the center of the antenna device 101 (center of antenna coil module 3) and the center of the antenna 4 of the reader/writer are aligned.

Furthermore, since conductor loops are not formed in the conductor layer 2 because the conductor layer 2 is provided with the slit SL, as illustrated in FIG. 4A, when the magnetic flux MF circulates through the conductor opening CA and around the outer edge of the conductor layer 2, eddy currents can be prevented from arising in the conductor layer 2 and losses due to such eddy currents can be minimized and prevented. As a result, the maximum possible communication range can be secured between the antenna device 101 and the antenna 4 on the reader/writer side.

In contrast to this, as illustrated in FIG. 4B, when there is no conductor layer 2, the magnetic flux MF, which passes through the coil opening CW, does not spread out in the left-right direction in FIG. 4B (direction of spreading when the antenna module 3 is viewed in plan view) and the degree of coupling with the antenna 4 on the reader/writer side is small. Therefore, a phenomenon occurs in which communication becomes increasingly unstable the closer the antenna device 101 and the reader/writer are brought to each other.

Moreover, in the antenna device according to a preferred embodiment of the present invention, the conductor layer causes large loops of magnetic flux to circulate and therefore magnetic flux reaches from the antenna device to the antenna on the communication partner side or from the antenna on the communication partner side to the antenna device and the maximum possible range of communication between the antenna device and the antenna on the communication partner side becomes large.

The following table lists results obtained when the size of the antenna coil module 3 was varied and the range over which communication can be performed between an antenna device 101 equipped with each of the antenna coil modules 3 and the antenna on the communication partner side was measured.

| Size of Antenna Coil Module | Without Conductor Layer | With Conductor Layer |
| --- | --- | --- |
| 22.5 mm × 20 mm | 0-24 mm | 0-44 mm |
| 22.5 mm × 19 mm | 0-23 mm | 0-43 mm |
| 22.5 mm × 18 mm | 0-19 mm | 0-41 mm |
| 22.5 mm × 17 mm | — | 0-39 mm |
| 22.5 mm × 16 mm | — | 0-38 mm |

For example, in the case of the antenna device equipped with the antenna coil module 3 having a size of, for example, about 22.5 mm×about 18 mm, when the conductor layer is included, the maximum possible communication range is increased to about 41 mm, in contrast to when the conductor layer is not provided and the maximum communication range is about 19 mm. Furthermore, for example, in the case of the antenna devices equipped with the antenna coil modules 3 having sizes equal to or less than, for example, about 22.5 mm×about 17 mm, communication is not possible at any distance when the conductor layer is not provided. In contrast, when the conductor layer is included, communication is possible over a wide range from, for example, about 0 mm to about 38 mm even in cases where the antenna device is configured so as to be equipped with a very small antenna coil module 3 such as the one having a size of about 22.5 mm×about 16 mm, for example.

Setting of the central resonant frequency of the antenna device 101 is preferably performed as follows. In a state in which the antenna coil module 3 illustrated in FIG. 2B is not in the vicinity of the conductor layer 2, in other words, in a stand alone state in which the antenna coil module 3 has not yet been mounted in the lower casing 1, while the antenna coil module 3 is connected in parallel with a resonance capacitor, the resonant frequency is set in advance to be lower than the central resonant frequency of the frequency band to be used. As illustrated in FIGS. 2B and 4A, when the antenna coil module 3 is brought close to the conductor opening CA of the conductor layer 2, since the inductance value of the antenna coil module 3 becomes smaller, the resonant frequency of the antenna device 101 increases. Consequently, the inductance value of the antenna coil module 3 in the stand alone state is determined so that the resonant frequency of the antenna device 101 once the antenna device 101 has been constructed by mounting the antenna coil module 3 inside the casing of the electronic appliance approximately coincides with the central resonant frequency of the frequency band to be used.

In addition, the inductance of the antenna device varies in accordance with the length and width of the slit SL. For example, when the slit SL is made to be large, the degree of reduction of the inductance value (increase of resonant frequency) when the conductor layer 2 is brought close to the antenna coil module 3 can be suppressed. Accordingly, the length and width of the slit SL are set so as to obtain a desired inductance value.

Furthermore, since the inductance varies with the positional relationship between the antenna coil module 3 and the conductor layer 2 and with the shape and size of the conductor opening CA of the conductor layer 2, the positional relationship between the antenna coil module 3 and the conductor layer 2 and the shape and size of the conductor opening CA of the conductor layer 2 are set so as to obtain a desired inductance value.

In this way, since the loops of magnetic flux are large due to the presence of the conductor layer, the coil opening CW of the coil conductor 31 may be made small and the antenna coil module can be reduced in size. Furthermore, together with making the coil opening CW small, the number of coil turns can be increased and the number of values of the inductance of the antenna coil module that can be adopted can be increased. As a result, setting of the resonant frequency is simplified.

As described above, in a preferred embodiment of the present invention, characteristics are used for which a magnetic field cannot penetrate into the conductor layer and the emission pattern of the magnetic field at the frequency being used is caused to change due to the presence of the conductor layer.

Stable communication can be performed with the antenna device 101 according to a preferred embodiment of the present invention, even when there are various sizes of the antenna device 101 and the antenna 4 on the reader/writer side. In other words, in the case where the antenna 4 on the reader/writer side is large, magnetic flux circulates in large loops due to the presence of the conductor layer 2 and the magnetic flux from the antenna device 101 reaches the antenna 101 on the reader/writer side, and in the case in which the antenna 4 on the reader/writer side is small, the distance that the magnetic flux reaches is increased due to the presence of the conductor layer 2.

Second Preferred Embodiment

Figure 5A:
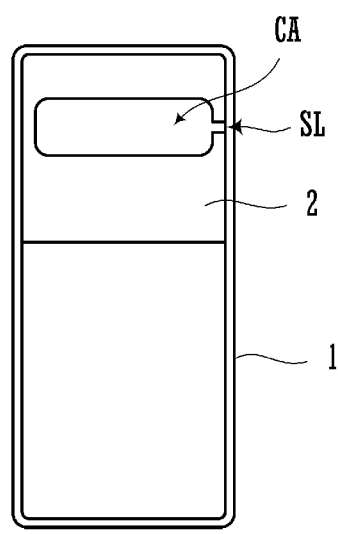
Figure 5B:
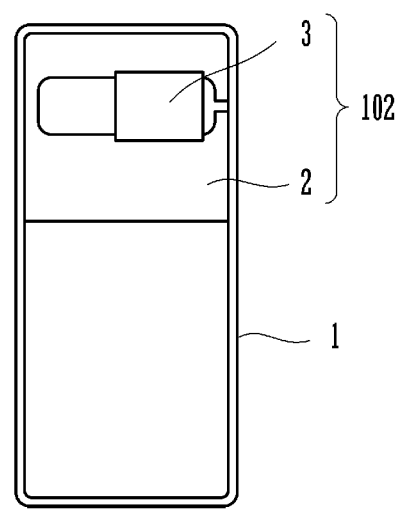

FIGS. 5A and 5B are views of an antenna device 102 according to a second preferred embodiment of the present invention. FIG. 5A is a plan view from the inner surface side of the lower casing 1 of the electronic appliance. Furthermore, FIG. 5B is a plan view of a state in which the antenna coil module 3 has been mounted on an inner surface of the lower casing 1.

In the second preferred embodiment, the conductor layer 2 is preferably provided on an inner surface of the lower casing 1. The conductor layer 2 is preferably formed by vapor deposition of a metal film such as aluminum or by adhesion of a metal foil, for example. In this way, a conductor layer may be provided on an inner surface of the casing.

Moreover, in the preferred embodiment illustrated in FIGS. 5A and 5B, the slit SL of the conductor layer 2 is provided in a portion for which the distance from the conductor opening CA to the edge is short.

The conductor layer 2 may be connected to the ground of a circuit inside the electronic appliance. By doing this, the conductor layer 2 can also serve as a conductor layer to shield the electronic appliance.

Third Preferred Embodiment

FIGS. 6A and 6B are plan views of an antenna device 103 according to a third preferred embodiment of the present invention. FIG. 6A illustrates an electric current that flows through the coil conductor 31 and FIG. 6B illustrates an electric current I that flows through the conductor layer 2. The antenna device 103 preferably includes the antenna coil module 3 and the conductor layer 2. The antenna coil module 3 is preferably constructed by stacking the flexible substrate on which the spiral-shaped coil conductor 31 has been formed on top of a magnetic sheet. Basically, this is the same as the configuration illustrated in FIGS. 3A and 3B. However, in this preferred embodiment, the two terminals of the coil conductor extend from the flexible substrate and connectors are provided at positions separated from the coil conductor 31.

The conductor layer 2 preferably includes the conductor opening CA and the slit SL, which connects the conductor opening CA and the outer edge of the conductor layer 2.

When the coil conductor 31 and the conductor layer 2 are viewed in plan view, the coil opening CW and the conductor opening CA are aligned and overlap over almost the entire peripheries thereof. With such a configuration, when the coil conductor 31 is viewed in plan view, the entirety of the coil conductor 31 can be covered by the conductor layer 2. Consequently, since the magnetic flux generated by the coil conductor 31 attempts to totally link to the conductor layer 2, a large current is generated in the conductor layer 2 in a direction opposite to that of the current that flows through the coil conductor 31 so as to block this magnetic flux. The large electric current I, which flows around the periphery of the conductor opening CA, flows along the periphery of the slit SL, through the plane of the conductor layer and along the periphery of the conductor layer due to the cut-edge effect. Accordingly, a strong magnetic field can be generated by the conductor layer and the communication range can be further widened. In addition, the loops of magnetic flux passing through the conductor opening CA and the coil opening CW and circulating around the conductor layer 2 are more effectively widened. Consequently, stable communication can be performed even when the electronic appliance equipped with the antenna device 103 is oriented in any direction among in-plane directions relative to the surface of the antenna on the reader/writer side.

Fourth Preferred Embodiment

FIG. 7A and FIG. 7B are a plan view and a front view of an antenna coil module 13 according to a fourth preferred embodiment, respectively. The antenna coil module 13 is positioned so as to be in the vicinity of a conductor layer, as illustrated in FIGS. 2A and 2B, similarly to the case of the first preferred embodiment. Due to the antenna coil module 13 being positioned in this way, a large electric current is generated in the conductor layer 2 and a strong magnetic field is generated around the conductor layer 2.

The antenna coil module 13 preferably includes the rectangular-plate-shaped flexible substrate 34 and the magnetic sheet 39 having the same rectangular shape. The spiral-shaped coil conductor 31, in which a winding center portion defines the coil opening CW, and connectors 32, which are used to connect to an external circuit, are provided on the flexible substrate 34. The coil conductor 31 is preferably arranged over two layers of the flexible substrate 34. The two layers are connected by via conductors. The magnetic sheet 39 preferably is, for example, composed of a ferrite formed in a sheet-shaped configuration.

In this way, a strong magnetic field is generated by the coil conductor due to the coil conductor 31 being wound over a plurality of layers, and as a result, a large current is made to flow in the conductor layer. In addition, the coil conductor can be centered and arranged so as to be aligned with the inner edge of the conductor opening. Accordingly, magnetic flux, which is centered on and generated by the coil conductor 31 attempts to link to the conductor layer and therefore a large current can be made to flow in the conductor layer.

Fifth Preferred Embodiment

FIG. 8 is a plan view of an antenna device 104 according to a fifth preferred embodiment of the present invention. The antenna device 104 preferably includes the antenna coil module 3 and the conductor layer 2. In the antenna coil module 3, a flexible substrate on which a spiral-shaped coil conductor has been formed is stacked on top of a magnetic sheet. This configuration is similar to that illustrated in FIGS. 6A and 6B. However, in this preferred embodiment, the coil opening CW is preferably slightly smaller than the conductor opening CA.

Since a portion of the coil conductor 31 is covered by the conductor layer 2, a current flows through the conductor layer 2 due to the magnetic flux generated by the coil conductor 31 as a result of this structure.

In addition, in each of the above-described preferred embodiments, the conductor layer is preferably provided on an outer surface or an inner surface of the casing, but the conductor layer may be arranged on an internal component of the casing. Furthermore, in the case where the casing itself is metal, the casing may be used as the conductor layer.

In addition, in each of the above-described preferred embodiments, the antenna coil module 3 is preferably constructed by stacking the flexible substrate 33 equipped with the coil conductor 31 on top of the magnetic sheet 39 composed of a ferrite; however, it may not be necessary to provide a magnetic sheet in an environment where there is no adverse influence on formation of loops of magnetic flux at the rear surface of the antenna coil module 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic appliance comprising:
    a casing including an inner surface and an outer surface;
    an antenna device; and
    a camera module provided in the casing and including a lens; wherein
    the antenna device includes:
        a coil conductor having a loop shape or a spiral shape in which a winding center portion defines a coil opening; and
        a conductor layer;
        the conductor layer includes a conductor opening;
        when the coil conductor is viewed in plan view, a portion of the coil conductor and the conductor layer are superposed one on top of the other;
        the conductor layer is arranged to function as a radiator to radiate a magnetic field;
        when the conductor layer is viewed in plan view, at least a portion of the lens of the camera module overlaps the conductor opening of the conductor layer; and
        when the conductor layer is viewed in plan view, a first portion of a periphery of the conductor opening is directly opposite to a periphery of the conductor layer and a second portion of the periphery of the conductor opening is not directly opposite to the periphery of the conductor layer.

2. The electronic appliance according to claim 1, wherein when the coil conductor is viewed in plan view, the second portion of the periphery of the conductor opening is opposite to an edge of the case.

3. The electronic appliance according to claim 1, wherein when the coil conductor is viewed in plan view, the second portion of the periphery of the conductor opening extends along a line that extends along a portion of the periphery of the conductor layer.

4. The electronic appliance according to claim 1, wherein when the coil conductor is viewed in plan view, the coil opening and the conductor opening at least partially overlap.

5. The electronic appliance according to claim 1, wherein an area of the conductor layer is larger than an area of a region in which the coil conductor is located.

6. The electronic appliance according to claim 1, wherein the coil conductor is wound across a plurality of layers.

7. The electronic appliance according to claim 1, wherein, when the coil conductor is viewed in plan view, the coil opening and the conductor opening overlap each other over almost entire peripheries thereof.

8. The electronic appliance according to claim 1, wherein a resonant frequency of the antenna device is lower than a central frequency of a to-be-used frequency band in a state in which the conductor layer is not present and is equal or substantially equal to the central frequency of the to-be-used frequency band in a state in which the antenna coil module has been mounted inside the casing of the electronic appliance.

9. The electronic appliance according to claim 1, wherein the coil conductor is not in contact with the lens.

10. The electronic appliance according to claim 1, wherein the antenna device is a HF band antenna that is used for HF band communication.

\* \* \* \* \*